United States Patent [19]
Brunning et al.

[11] Patent Number: 5,422,810
[45] Date of Patent: Jun. 6, 1995

[54] METHOD AND APPARATUS FOR DETERMINING STEERING POSITION OF AUTOMOTIVE STEERING MECHANISM

[75] Inventors: Alan D. Brunning, South Woodham Ferrers, England; Sam M. Mackool, Berkley; Geoffrey F. Bridges, Belleville, both of Mich.

[73] Assignee: Ford Motor Company, Dearborn, Mich.

[21] Appl. No.: 238,763

[22] Filed: May 5, 1994

[51] Int. Cl.[6] .................................................. B62D 5/00
[52] U.S. Cl. ............................... 364/424.05; 180/79.1; 180/141
[58] Field of Search ................. 364/424.05, 424.01, 364/551.01, 559; 340/465; 280/707, 94; 318/565; 180/79.1, 140, 143, 41, 142

[56] References Cited

U.S. PATENT DOCUMENTS

| | | | |
|---|---|---|---|
| 4,621,833 | 11/1986 | Soltis | 280/707 |
| 4,722,545 | 2/1988 | Gretz | 280/771 |
| 4,794,536 | 2/1988 | Eto | 364/424.05 |
| 4,848,791 | 7/1989 | Bridges | 180/79 |
| 4,853,860 | 8/1989 | Achenbach | 364/424.05 |
| 4,867,466 | 9/1989 | Soltis | 280/94 |
| 4,939,654 | 7/1990 | Kouda et al. | 364/424.05 |
| 4,954,957 | 9/1990 | Kawagoe et al. | 364/424.05 |
| 4,999,776 | 3/1991 | Soltis | 364/424.05 |
| 5,032,996 | 7/1991 | Shiraishi | 364/424.05 |
| 5,032,998 | 7/1991 | Filleau | 364/424.05 |
| 5,065,323 | 11/1991 | Shiraishi | 364/424.05 |
| 5,065,324 | 11/1991 | Oshita | 364/424.05 |
| 5,253,172 | 10/1993 | Ito et al. | 364/424.05 |

Primary Examiner—Kevin J. Teska
Assistant Examiner—Tan Nguyen
Attorney, Agent, or Firm—Gregory P. Brown; Roger L. May

[57] ABSTRACT

A method and apparatus for determining a center position of the vehicular steering system includes a steering sensor and a control unit. A dynamic center find routine and a long term center find routine are run simultaneously and the results compared to assure accurate dynamic center position for controlling automotive devices.

8 Claims, 6 Drawing Sheets

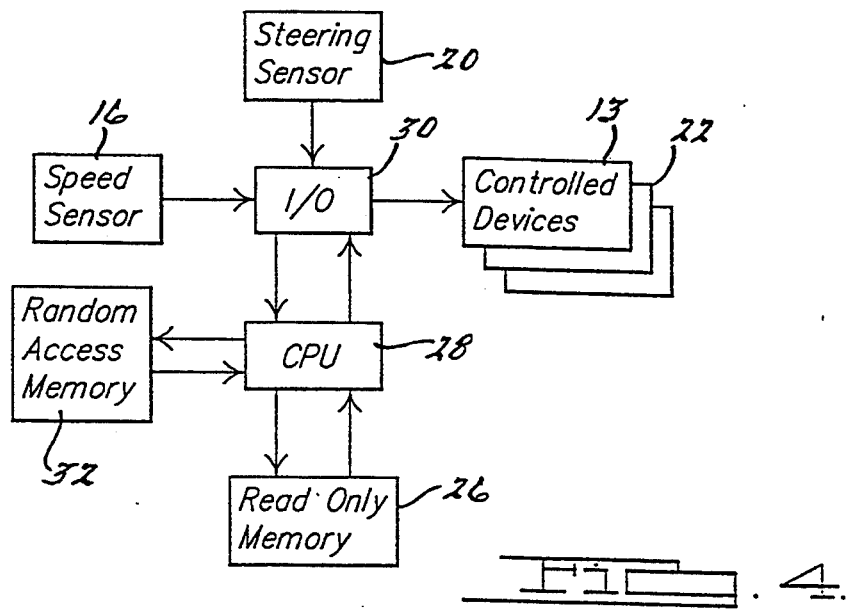
FIG. 4.
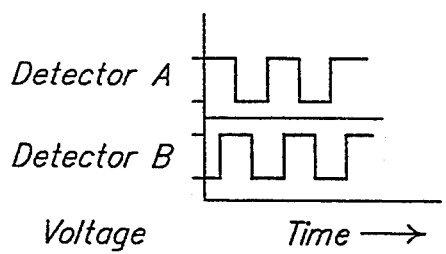
FIG. 5A.
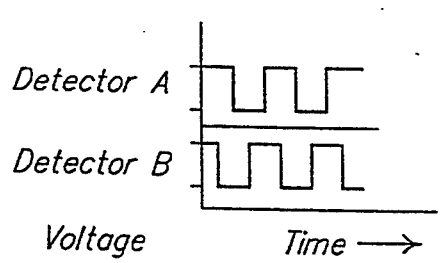
FIG. 5B.
| | Detector A | Detector B | |
|---|---|---|---|
| | 0 | 0 | |
| Counter-Clockwise Rotation | 1 | 0 | Clockwise Rotation |
| | 1 | 1 | |
| | 0 | 1 | |
| | 0 | 0 | |
| | 1 | 0 | |
FIG. 6.

METHOD AND APPARATUS FOR DETERMINING STEERING POSITION OF AUTOMOTIVE STEERING MECHANISM

BACKGROUND OF THE INVENTION

1. Field of the Invention

This invention relates to a method and apparatus for determining the steering position of a vehicular steering mechanism. This method and apparatus are useful for controlling a vehicular suspension system or other automotive devices.

2. Disclosure Information

Adaptive automotive suspension systems are known in the art. An example of such a system is shown in U.S. Pat. No. 4,621,833, which is assigned to the assignee of the present invention. The system of the '833 patent, as well as other known adjustable suspension systems, adjusts the damping force produced by one or more suspension units according to a plurality of inputs from different sources within the vehicle. For example, it is known from the '833 patent to control suspension units by utilizing vehicle linear acceleration, braking, steering activity, vehicle speed, predicted lateral acceleration, and other inputs.

The use of steering angle sensors to provide steering input for the control of suspension units is commonly known. Systems employing fixed steering angle sensors are prone to failure due to misadjustment of the sensor inasmuch as precise angular measurements must be obtainable from such sensors if they are to be employed in systems capable of correcting or anticipating and preventing excessive roll of an automobile body during a cornering maneuver. Also, such sensors are unable to compensate for changes in wheel alignment due to impacts with road obstructions or wear within the steering mechanism. A related problem affects systems employing centrifugal force sensors inasmuch as such force cannot be sensed until it exists, and once such force has come into existence the vehicle's body will typically have assumed an attitude that can be corrected only by an active suspension device capable of exerting force independently of its velocity of operation. Thus, to be effective, a device for providing steering input to a control system for operating suspension units should anticipate lateral acceleration rather than merely sense acceleration. U.S. Pat. No. 4,621,833 discloses a steering center position algorithm and method for finding steering center position which is suitable for use in a system capable of anticipating lateral acceleration rather than merely sensing such acceleration.

The steering sensor system disclosed in U.S. Pat. No. 4,621,833 employs a software program in which steering center position is determined through the use of a fixed sample time detection scheme operating with variably-sized, circumferential window zones of operation of a steering shaft. Because the sampling time associated with the algorithm of U.S. Pat. No. 4,621,833 is fixed, the system disclosed therein has a limited capacity to deal with changes in steering center position.

The steering sensor system disclosed in U.S. Pat. No. 4,848,791, which is assigned to the assignee of the present invention, utilizes a software program in which steering center position is statistically determined over a fixed period of time sufficient to insure an accurate center position. This system takes an undue length of time to determine the center position and is further unable to continuously compensate for transient conditions, such as cross winds, road crown, and electronic component drift. Any combination of these can occur, thereby reducing the accuracy of the calculated instantaneous steering position, which is dependent on the underlying center position.

It is an object of the present invention to provide a method and apparatus for determining the center position of a vehicular steering mechanism which will rapidly determine a correct steering position when the vehicle system is first keyed on and which continuously updates that center position as time progresses until the vehicle is turned off.

SUMMARY OF THE DISCLOSURE

In accordance with the present invention, a method for determining the steering position of an automotive steering mechanism comprises the steps of; counting the number of steps the steering mechanism moves from a steering position; processing the counted steering position data to calculate a steering rate; processing the counted steering position data to calculate a dynamic center position representing running average determined over a predetermined period of time; determining the confidence of the dynamic center position from the counted steering position data; processing the counted steering position data to calculate the instantaneous steering position of the steering mechanism; and switching a controlled automotive device based on only the steering rate data when there is no confidence in the dynamic center position and switching a controlled automotive device based on both steering rate and steering position when there is confidence in the dynamic center position.

According to the present invention, an apparatus for determining the steering position of an automotive steering mechanism comprises signal means for generating a first signal related to the rotational motion of the steering mechanism. The apparatus further includes a rate processing means for generating a steering rate signal from the first signal and position processor means for generating and updating a dynamic center position signal from the first signal and determining the statistical confidence in the dynamic center position signal and setting a first flag either positive to indicate confidence in the dynamic center position signal or negative to indicate lack of confidence in the dynamic center position signal. The position processor further determining an instantaneous steering position signal relative to the first signal and the dynamic center position signal. The apparatus also includes control means for controlling an automotive device using the steering rate signal when the first flag is negative and controlling the automotive system using both the steering rate signal and the instantaneous steering position signal when the first flag is positive.

BRIEF DESCRIPTION OF THE DRAWINGS

FIG. 4 is an overall system block diagram in accordance with an embodiment of this invention.

FIG. 5A illustrates the output waveforms of the detectors employed in the steering sensor illustrated in FIGS. 2 and 3 for clockwise rotation.

FIG. 5B illustrates the output waveforms of the detectors employed in the steering sensor illustrated in FIGS. 2 and 3 for counterclockwise rotation.

FIG. 6 is a truth table illustrating the outputs of detectors A and B shown in FIGS. 2-3 as the steering sensor of the present invention is rotated counterclockwise and clockwise.

DESCRIPTION OF THE PREFERRED EMBODIMENTS

Figure 1:
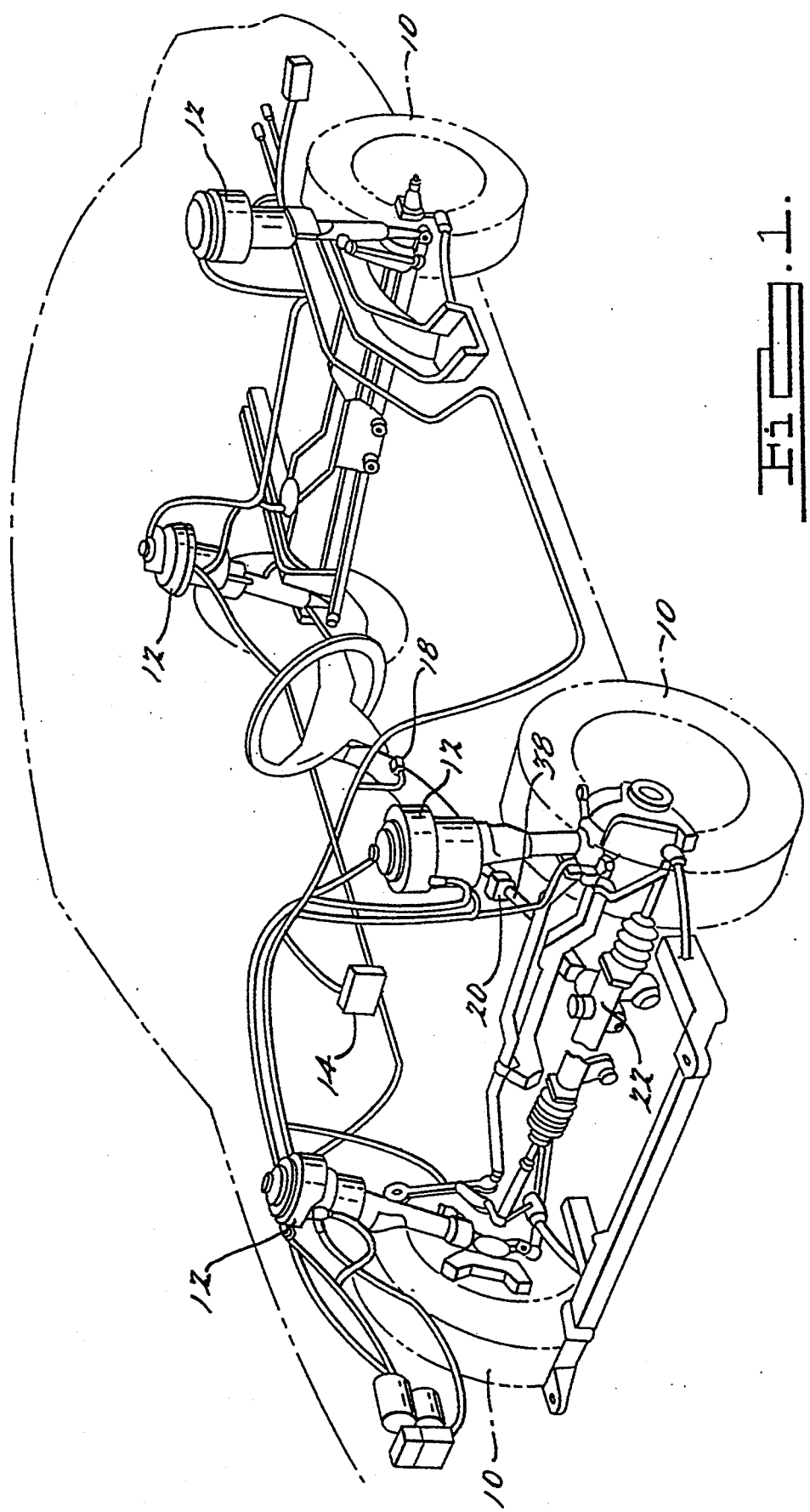
FIG. 1 is a perspective drawing of a motor vehicle including a system according to the present invention. This figure shows various components of a system embodying the present invention.

As shown in FIG. 1, a method and apparatus according to the present invention is intended for use with adjustable suspension units and also steering gears typically found in automotive vehicles. The motor vehicle shown in FIG. 1 is equipped with adjustable front and rear suspension units 12, which cooperate with wheel and tire assemblies 10. These suspension units may be constructed in a known manner such as that disclosed in U.S. Pat. No. 4,313,529, which discloses means for constructing a strut or shock absorber which is adjustable by a rotary valve positioned within one of the passageways running through the piston of the shock absorber or strut. The rotary valve functions to vary the effective cross sectional area of the passageway, thus providing an adjustable damping force. Those skilled in the art will appreciate in view of this disclosure that a system according to the present invention could be utilized to control not only adjustable suspension units and steering gears but also other types of adjustable vehicular devices such as electronically controlled hydraulic braking systems, hydraulic crossover suspension systems, variable volume air suspension springs, or variable stabilizer bars. Similarly, system according to the present invention could be employed with semi-active and active suspension devices.

The component parts of a system which may be used with the present invention are shown in FIGS. 1-4. Accordingly, control module 14 receives inputs from steering sensor 20, speed sensor 16, and brake sensor 18. Although not illustrated, height sensors and accelerometers could be employed with a suspension control system utilizing the present invention. The suspension units are illustrated in FIG. 1 as being of the variable volume air spring type operating with compressed air supplied by compressor (not shown). A system according to the present invention could, as previously noted, be used with other types of suspension units or other automotive equipment with which it is necessary to know the position of the steering mechanism.

Those skilled in the art will appreciate in view of this disclosure that speed sensor 16 could comprise any of a variety of devices or systems employed in automotive vehicles. It has been determined, for example, that a combined vehicle speed and distance sensor used with current model Ford Motor Company vehicles comprising a hall effect signal generator driven by a vehicle power train component, such as the transmission, is useful for providing a speed signal to a suspension control system.

Referring to FIG. 4, a control module may output commands to suspension unit operators 13 and to steering gear 22 (controlled devices 13 and 22, respectively, FIG. 4). Those skilled in the art will appreciate in view of this disclosure that the processor within the control module and its associated peripheral equipment could be structured according to several different architectures. In a preferred embodiment, however, the processor is configured so that a control program is sequentially read for each unit command from a read-only memory (ROM) 26 which stores preset control programs. Unit commands are executed by a central processing unit (CPU) 28. The processor integrally includes an input-output control circuit (I/O) 30 for exchanging data with external devices and a random access memory (RAM) 32 for temporarily holding data while the data are being processed. Preferably, the processor operates at a clock speed of between 2–18 MHz.

Steering sensor 20, acting in conjunction with control module 14, includes means for measuring the excursion angle of the steering mechanism as a series of marker counts or steps measured from the initial position which the steering mechanism occupied when the system was activated by an operator keying on the ignition of the vehicle.

Figure 2:
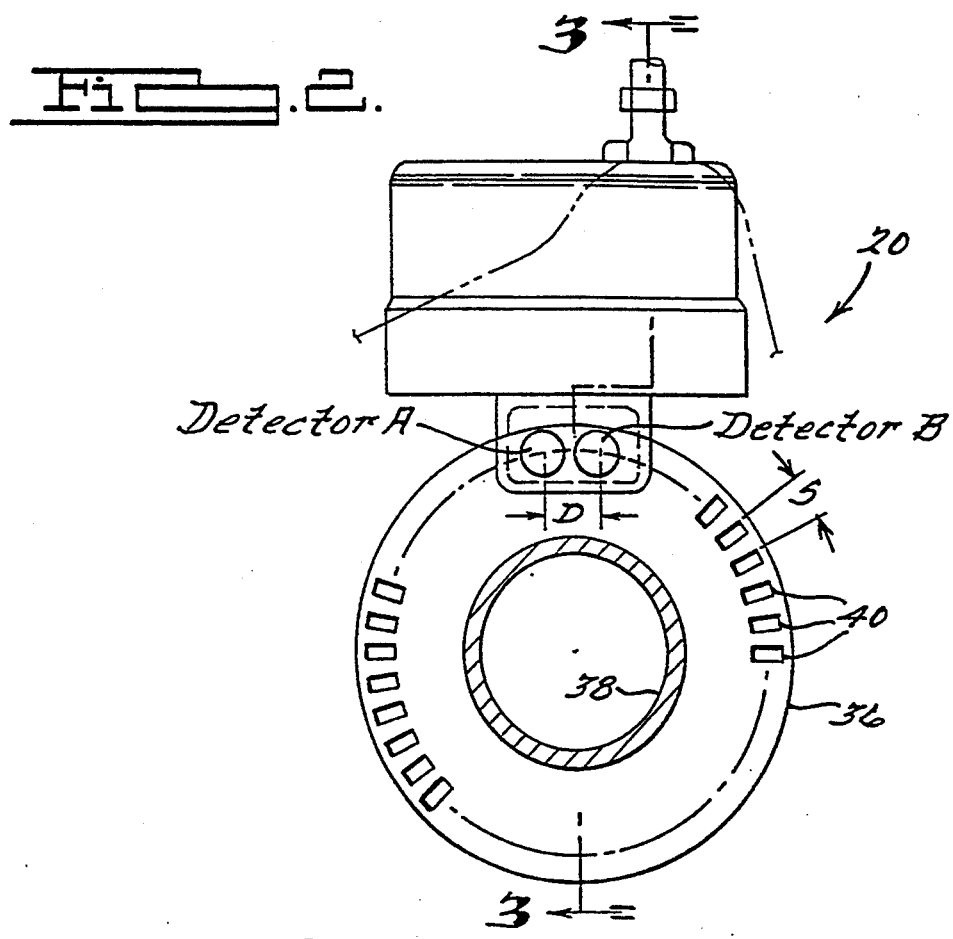
FIG. 2 is a plan view, partially cut away, of a steering sensor comprising a component part of a system according to the present invention.
Figure 3:
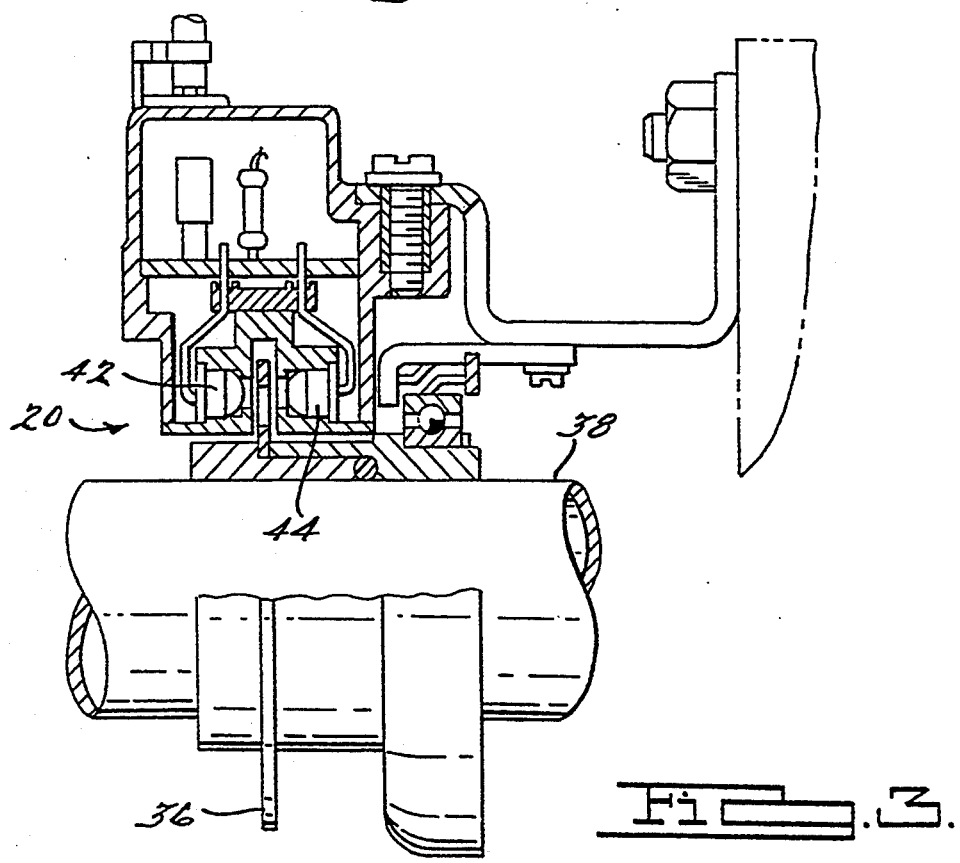
FIG. 3 is a cross sectional view of the steering sensor of the present invention taken along the line 3—3 of FIG. 2.

As shown in FIGS. 2 and 3, steering sensor 20 comprises shutter wheel 36 attached to steering shaft 38, which shaft rotates in unison with the steering wheel as the steering wheel is turned by the driver of the vehicle. Shutter wheel 36 has a plurality of apertures 40, in this case 48 in number, which apertures serve to trigger the activity of spaced apart detectors A and B as the shutter wheel is rotated with the steering system of the vehicle. Detectors A and B detect movement of the shutter wheel. Because there are 48 apertures contained within shutter wheel 36, the steering sensor provides a signal 192 times during one revolution of the steering wheel and as a result each of the 192 counts or steps indicates 1.875 degrees of rotation of the steering mechanism.

As shown in FIG. 3, each of detectors A and B includes a light emitting diode (LED) 42 and a photo diode 44. The combination of the LED and photo diode is used to detect movement of shutter wheel 36 and, hence, the steering mechanism. This is possible because the photo diodes have two states; i.e., they are bistable. A conducting state occurs whenever light from the paired LED passes through an aperture 40 in the shutter wheel and impinges upon the photo diode. The output of the detector circuit then rises to approximately 10 volts. A nonconducting state exists whenever the shutter wheel blocks the transmission of light between the LED and the photo diode. As shown in FIG. 5A, clockwise rotation of shutter wheel 36 produces a waveform pattern for the detectors in which detector A undergoes its transition prior to detector B. In other words, detector A leads detector B. This results from the spacing between the detectors, shown as dimension D in FIG. 2 with respect to the spacing between the apertures shown as dimension S in FIG. 2. More precisely, dimension D is 1.75 times dimension S. As shown in FIG. 5S, counterclockwise rotation of the steering sensor produces a waveform pattern for the detectors in which detector A undergoes its transition after detector B and detector A thus lags detector B. The outputs of detectors A and B are fed into the control module, and in this manner the control module is allowed to track the direction of the steering mechanism's movement. Increasing the number of apertures on shutter wheel 36 improves the resolution of the sensor. The present invention allows a significant increase in the number of apertures while maintaining the ability to reject meaningless steering wheel excursions (by determining a finer resolution).

FIG. 6 is a tabulation of the waveforms shown in FIGS. 5A and 5B in a digital format. In conventional fashion, the approximately 10 volts maximum output of the detectors is treated as a logical "1", while the zero output state is treated as a logical "0". FIG. 6 shows each of the possible logic pair states which could be output by detectors A and B. The pairs are arranged in the order in which they will be received by the control module for both counterclockwise and clockwise rotation. As seen in FIG. 6, counterclockwise rotation is read from the bottom of the figure to the upper part of the figure with clockwise rotation being read from the top of the tabulation to the lower part of the tabulation. Thus, it may be realized that detector devices A and B generate a cyclical series of two-bit, binary coded words, with each word corresponding to a finite amount of rotation of steering shaft 38. In essence, each code word may be considered as a count or marker or step representing 1.875 degrees of rotation of the steering shaft. As such, each count represents a small movement of the steering mechanism or system (using the grey scale format.) The use of these counts or steps in a system according to the present invention will be explained in conjunction with FIGS. 7A, 7B and 7C.

The output of detectors A and B may be further processed by the control module to yield a signal indicating the steering mechanism's turning rate or angular velocity. This operation is performed quite simply by merely tracking the number of transitions of one or both detectors and a corresponding period of time. The number of such transitions counted divided corresponding period of time will be directly proportional to the steering rate of the steering mechanism. Those skilled in the art will appreciate in view of this disclosure that although the steering sensor described herein operates according to digital electronics principles, the present invention could be practiced through the use of other types of steering sensors such as analog electronic or other types of steering sensors having the capability of generating a series of counts representing finite movements of the steering mechanism.

The output of the present invention is a calculated number representing the number of 1.875 degree counts or steps at which the steering mechanism is instantaneously being operated as measured from what is inferred to be the correct center position of the steering mechanism. Specifically, the present invention provides an improvement in determining the inferred center position, in the present invention referred to as dynamic center position, necessary for calculating the steering position. This improvement is achieved by using two methods to determine the dynamic center position. Initially, when the operator first starts the vehicle, the dynamic center position is assumed to be the current position of the steering sensor. Prior to using this calculated center position, however, the processor uses a crossing routine to confidently establish the accuracy of this initial assumption. Until the processor establishes this confidence, the processor only uses steering rate data to control the adaptive suspension.

Once the processor establishes confidence in the dynamic center position, it continually updates the dynamic center position and confirms confidence by comparing the dynamic center position to a long term center position determined by a long term center position routine. The processor determines the long term center position simply by averaging all of the center position data measured. After a predetermined period of time, on the order of several minutes, this value is representative of the long term center position. One example of a system implementing a long term center routine is described in U.S. Pat. No. 4,848,791, which is assigned to the assignee of the present invention and is hereby incorporated by reference. Using these two routines allows the use of a responsive dynamic center position routine which enables compensation for minute deviations caused by crowned roads, cross winds, etc. Such a responsive routine by itself, however, is subject to "getting lost", which is prevented by continuously checking the dynamic center position against the long term center position. The operation of the dynamic center position routine and how it is integrated into a system simultaneously employing the long term center position routine will be described below.

Figure 7A:
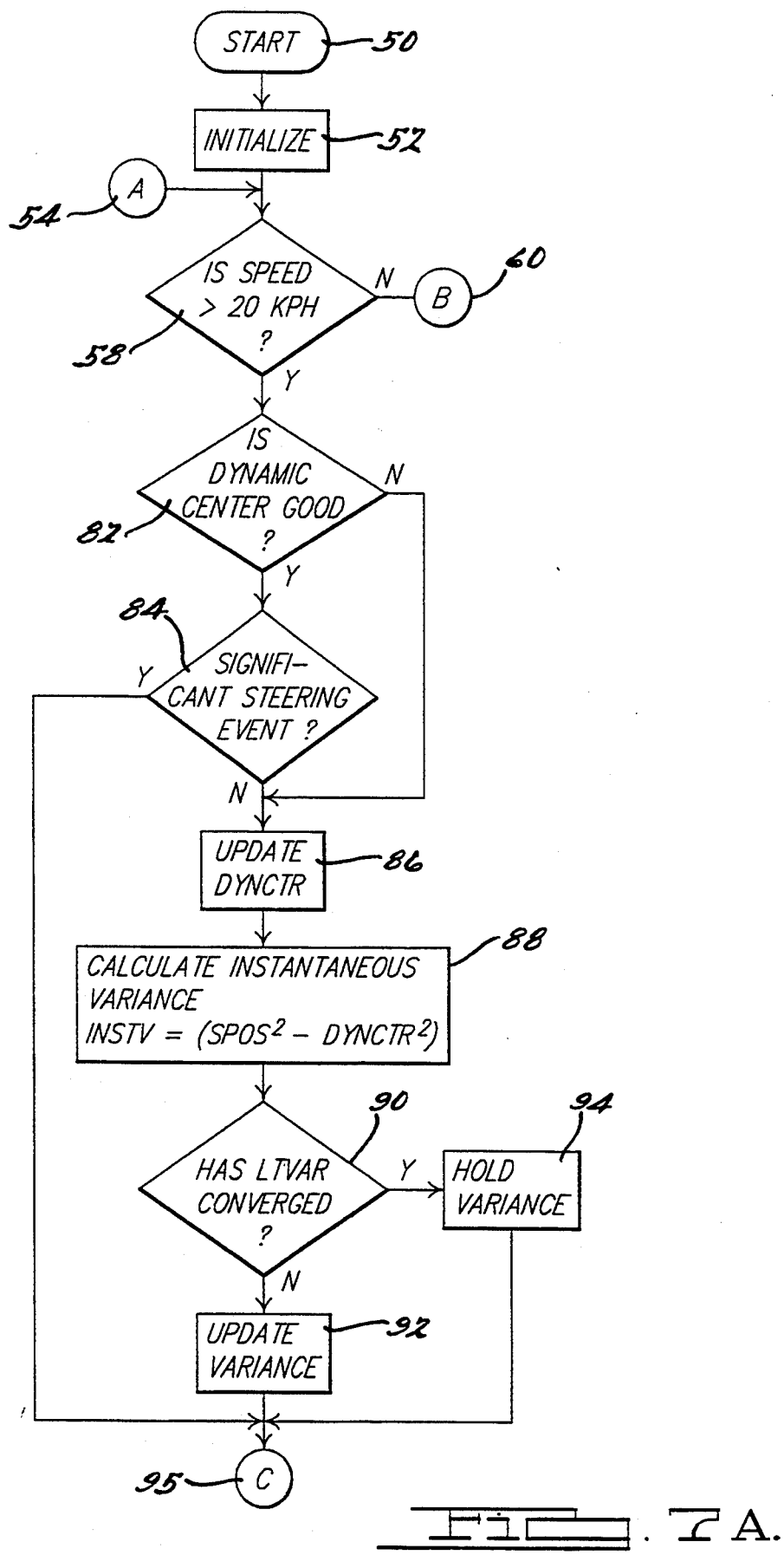
FIGS. 7A, 7B and 7C are logic flow block diagrams in accordance with the principles of the present invention.

Turning now to FIG. 7A, operation of a system according to the present invention will be further explained. At block 50 the processor starts the illustrated algorithm when the operator keys on the vehicle ignition. The processor then moves to initialization block 52 where a variety of timers, variables and parameters are initialized. The processor then steps past the return block 54 to a logical block 58. At block 58 the processor determines if the vehicle speed is greater than 20 k.p.h. If the speed is less than 20 k.p.h., as is likely immediately after vehicle start up, the processor jumps to logical block 62 via advance block 60.

Figure 7B:
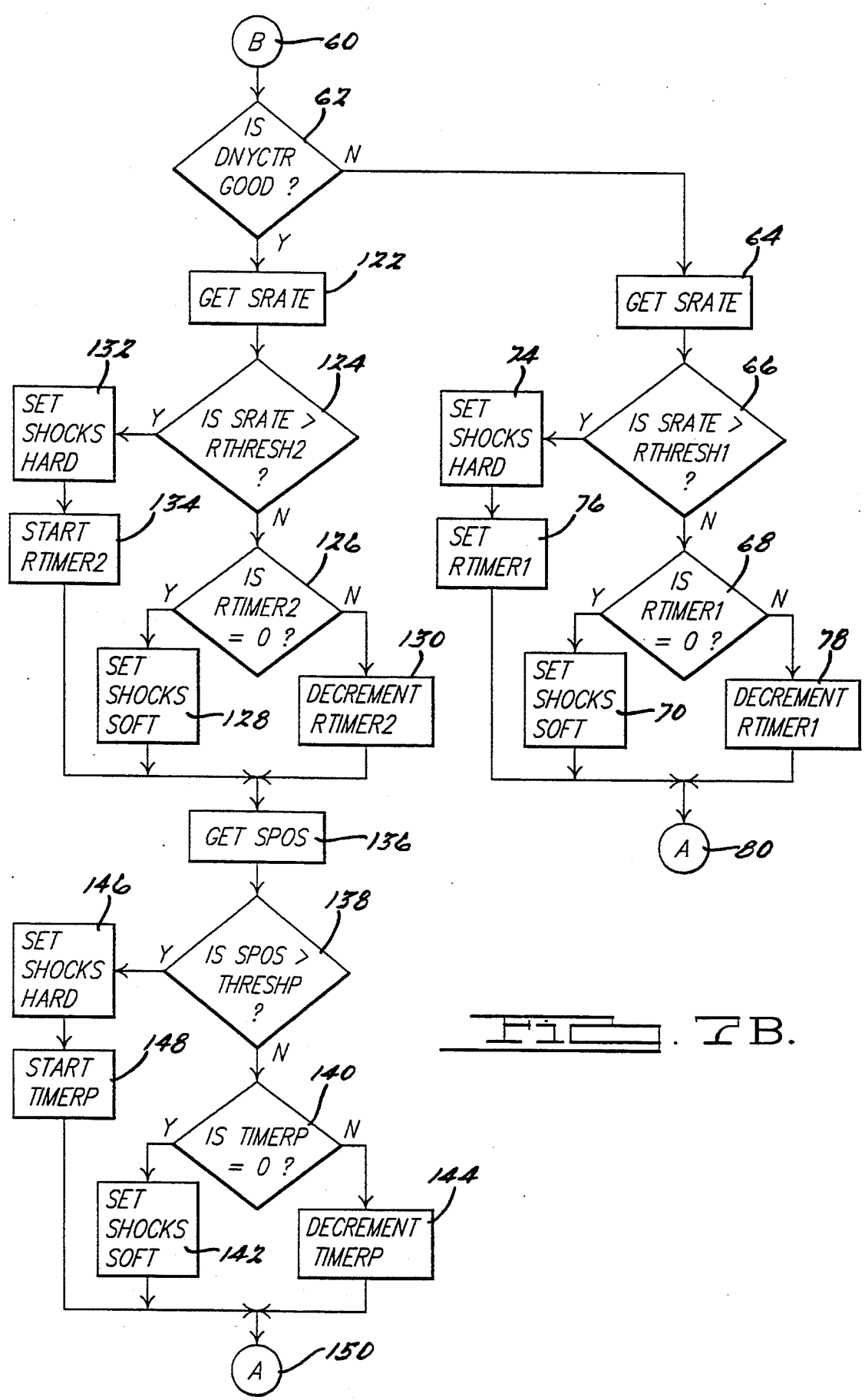

Referring now to FIG. 7B, at logical block 62, the processor checks the confidence of the dynamic center position. At the initialization block 52, the processor initializes a dynamic center flag, GOODS, such that logical block 62 responds in the negative. GOODS represents whether or not the processor has established confidence in the dynamic center position, DYNCTR. When the processor is confident of DYNCTR, GOODS is positive and block 62 directs the processor to the steering rate and position portion of the control routine. When the processor is not confident of DYNCTR, GOODS is negative and block 62 directs the processor to the steering rate only portion of the control routine.

For the purposes of clarity, the steering rate only portion of the control routine will be described now in its entirety. This is equivalent to assuming the following conditions for the purposes of this description: the vehicle speed is less than 20 k.p.h. and there is no confidence in DYNCTR. It should be understood, after reading the entire specification, that this is not necessarily the order in which the processor must proceed through various routines.

The processor proceeds to the steering rate only control portion of the routine at block 64 and calculates the steering rate, SRATE, as described above. At logical block 66 the processor compares SRATE to a first steering rate threshold, RTHRESH1. The steering rate threshold is an application specific tuning constant that controls when the processor switches the shocks from soft to hard damping position. Referring to block 66, if SRATE is less than RTHRESH1, the processor proceeds to logical block 68, where the processor checks a first steering rate timer, RTIMER1, to determine if its value is zero. Here, RTIMER1 is zero since the processor initialized RTIMER1 to zero at block 52. The processor proceeds through block 70, maintaining the soft setting of the shocks, to the top of the algorithm at block 54 via return block 80.

When the processor returns to logical block 66, if SRATE is now greater than RTHRESH1, the processor proceeds to block 74 and sets the shocks hard and block 76 sets RTIMER1 to a predetermined value corresponding to the duration for which the shocks will remain hard. The processor proceeds through return block 80 to logical block 58. If the processor continues through the steering rate only control, at logical block 66, assuming SRATE is now less than RTHRESH1, the processor proceeds to logical block 68. At this point the processor decrements RTIMER1. This cycle repeats until RTIMER1 is zero, at which point logical block 68 sends the processor to block 70 which sets the shocks to the soft position.

Referring back now to FIG. 7A, the update portion of the routine will be described. The update portion of the routine determines and continuously updates the DYNCTR regardless of the confidence in DYNCTR as long as the vehicle speed is above 20 k.p.h. Logical block 58 prevents the processor from using steering input data while vehicle speeds are less than 20 k.p.h. Filtering out the low speed steering data enables the processor to more rapidly obtain a confident value for DYNCTR. Recall that the processor initializes DYNCTR at the position of the steering wheel at start up. The processor also initializes block 52 GOODS to indicate that there is no confidence in this assumed value for DYNCTR.

Proceeding to block 86, where the processor calculates a new DYNCTR. DYNCTR represents a 38 second running average of the instantaneous steering sensor output, POS, as the processor reads it from the steering position sensor 20. The time period, here 38 seconds, is a value chosen for engineering purposes, and the present invention is not intended to be so limited. The ability to use such a short time period is an advantage of the present invention. Advantageously, the time period could be effectively set in a range from 20-45 seconds. The processor also calculates the steering position, SPOS, which is a value representing the instantaneous steering position relative to DYNCTR. The processor proceeds to block 88 and calculates the instantaneous variance, INSTV, according to the following relationship:

$$INSTV = (SPOS^2 - AVANGLE^2).$$

Where:
SPOS = instantaneous steering position;
INSTV = instantaneous variance of the SPOS; and
AVANGLE = 38 second average of SPOS.

Once a confident DYNCTR is found, the processor utilizes INSTV for determining the "significance" of the current steering event, as will be more fully described below.

Once a confident DYNCTR has been found, the update routine incorporates the significant steering event filter into the DYNCTR update routine. A significant steering event is a large steering wheel excursion, such as an off ramp from an expressway, during which the processor rejects steering position data for updating purposes. This enhances the reliability of DYNCTR by enabling the update routine to reject data that would improperly skew the DYNCTR. At block 84 the processor determines if the present steering position is "significant". The processor evaluates the following expression when making this determination:

$$INSTV*V1 < LTVAR.$$

Where:
INSTV = instantaneous variance of the SPOS;
V1 = predetermined tuning constant; and
LTVAR = 38 second average INSTV.

The tuning constant V1 incorporates such considerations as characteristics of the type of vehicle, and the operational environment it is being designed for. It should be recognized that this number is a design constant that will vary among vehicle applications.

Implementing the significant event filter in the present embodiment further requires blocks 90 and 94 operate together as a "lockout" loop to prevent LTVAR from converging to zero. Proceeding to logical block 90 the processor determines if the long term variance, LTVAR, has converged upon a predetermined limit, LIM1. Like DYNCTR, LTVAR is an 38 second running average of INSTV. At initialization block 52 the processor initializes LTVAR at some value greater than LIM1. If LTVAR has not yet converged, the processor updates LTVAR at block 92. If LTVAR has converged upon LIM1, the processor proceeds through block 94 thereby preventing further updating of LTVAR. The processor next proceeds through advance block 95 to the top of the crossing routine.

Figure 7C:
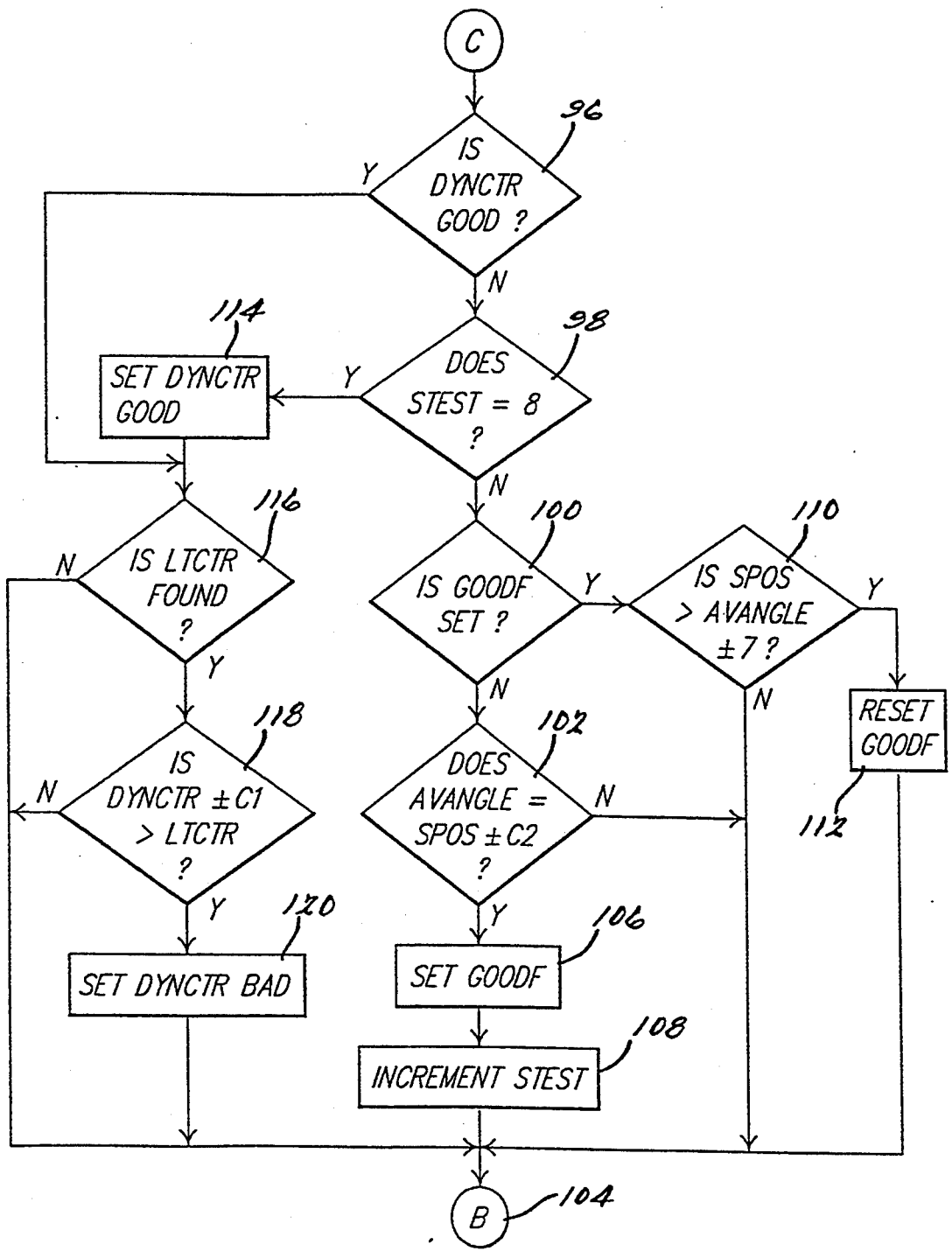

Referring to FIG. 7C, the crossing routine will be described. The processor uses the crossing routine to initially establish confidence in DYNCTR. The processor only executes the crossing routine if at logical block 96 GOODS indicates that there is no confidence in DYNCTR. If there is no confidence in DYNCTR, the processor enters the crossing routine at logical block 98.

The crossing routine is based on the following principle: the confidence in DYNCTR is proportional to the number of times the actual steering position crosses the position thought to be the center. For example, as the vehicle is driven down the road the steering wheel is likely to be oscillated back and forth about the true straight ahead position. If DYNCTR corresponds to the actual straight ahead position, each of these oscillations will result in a "crossing." However, if DYNCTR does not correspond to this position, only relatively larger oscillations will result in "crossings." Therefore, the higher the frequency of crossings, the greater the confidence in the current DYNCTR. Based on this principle, the system will not declare confidence in DYNCTR until a predetermined number of crossings occurs.

Referring back to FIG. 7C, at logical block 98 the processor determines whether the number of crossings, represented by counter STEST, equals a predetermined value, such as 8. It should be recognized that this number is a design variable that will vary among vehicle applications. At the initialization block 52 STEST is set to zero, which causes the processor to proceed to logical block 100. At logical block 100 the processor checks a flag, GOODF, which ensures that a single, long duration steering event can only result in a single crossing. If GOODF is negative, the processor proceeds to logical block 102 to determine if the present SPOS is a crossing. If AVANGLE is not equal to SPOS, the processor proceeds through return block 104 to block 60 to control the adaptive suspension as described above. If, on the other hand, AVANGLE is equal to SPOS plus or minus a tuning constant, C2, then the processor sets GOODF positive at block 106, indicating a crossing. The processor increments STEST at block 108 and continues to block 104 where the processor is directed to block 60 where the appropriate control is implemented.

The processor continues to reenter the crossing routine at block 98 until confidence in DYNCTR is established and GOODS is set positive. As described above, if STEST does not equal 8, the processor will proceed to logical block 100. At logical block 100, with GOODF positive from the last crossing found and set at block 106, the processor diverts to block 110 where the processor determines if the steering wheel has moved away from the steering event that originally set GOODF at block 106. To compensate for steering system hysteresis, the processor requires SPOS to return beyond AVANGLE by a predetermined constant, here 7 counts. If the processor determines that the steering position has not crossed back, the processor proceeds from logical block 110 to logical block 104, where the cycle is repeated.

When the processor determines that the steering position has crossed back out of the center position, logical block 110 directs the processor to reset GOODF at block 112. The processor then proceeds to block 104 and eventually returns to logical block 100 where now GOODS is negative, and the crossing routine checks for the next crossing. This process is continued until STEST equals 8, as required at logical block 98, at which point the processor proceeds to block 114, where GOODS is set positive indicating confidence in DYNCTR. The crossing routine is not used again unless, as will be described below, DYNCTR falls outside of a predetermined window established by the long term center routine.

The processor then proceeds from block 114 to logical block 116 where the processor determines whether a long term center, LTCTR, has been determined. This is necessary because the long term center routine typically takes more time than the crossing routine. If LTCTR has been found logical block 116 directs the processor to logical block 118 where processor determines whether DYNCTR plus or minus a predetermined calibration variable, C1, is greater than LTCTR. If the result is yes, then the confidence in DYNCTR is deemed improper, and GOODS, along with other variables, such as STEST, are reset at block 120, thereby forcing the processor to restart the crossing routine. If the result is no, logical block 118 directs the processor to block 104, where the processor proceeds to control the adaptive shocks using DYNCTR.

Referring to FIG. 7B, at block 62, now with a confident DYNCTR, the processor will implement the control portion of the routine that uses both steering position and steering rate data. The processor proceeds to block 122, and calculates the steering rate, SRATE. At logical block 124 the processor compares SRATE to RTHRESH2. It should be noted that the present embodiment utilizes two steering rate thresholds, RTHRESH1, and RTHRESH2, to increase the flexibility of control depending on whether DYNCTR is known. If SRATE is less than RTHRESH2, the processor proceeds to logical block 126, where the processor checks a second steering rate timer, RTIMER2, to determine if its value is zero. The first time through RTIMER2 will be zero since the processor initialized RTIMER2 to zero at block 52. The processor proceeds through block 128 to block 136, maintaining the soft setting of the shocks.

If, at logical block 122, SRATE exceeds RTHRESH2, the processor proceeds to block 132 and sets the shocks hard and block 134 sets RTIMER2 to a predetermined value corresponding to the duration for which the shocks will remain in the hard setting. The processor proceeds through the steering position based control at block 136 and eventually cycles back through the rate control routine. If SRATE is less than RTHRESH2 logical block 124 directs the processor to logical block 126 to decrement RTIMER2. The processor repeats this cycle until RTIMER2 is zero, where logical block 126 sends the processor to block 128 to switch the shocks soft.

The steering position based control begins at block 136. At block 136 the processor determines the current steering wheel position, SPOS, and at logical block 138 determines if SPOS is less than the steering position threshold, THRESHP. If the SPOS is less than THRESHP, the processor proceeds to logical block 140, where the processor checks a steering position timer, TIMERP, to determine if its value is zero. The first time through TIMERP will be zero since the processor initialized TIMERP to zero at block 52. The processor proceeds through block 142 to block 150, maintaining the soft setting of the shocks.

When SPOS exceeds THRESHP, the processor sets the shocks hard at block 146 and at block 148 sets TIMERP to a predetermined value corresponding to the duration for which the shocks will remain hard. When SPOS drops below THRESHP, logical blocks 138 and 140 direct the processor to logical block 144 to decrement TIMERP. The processor repeats this cycle until TIMERP is zero, where logical block 140 sends the processor to block 142 to set the shocks soft. In each case, the processor proceeds through block 150 to block 58 where the processor continuously updates DYNCTR and eventually cycles back through the steering position control routine.

Various modifications and variations will no doubt occur to those skilled in the art to which this invention pertains. For example, the particular sensors used in conjunction with the disclosed system may be varied from those herein and the system may be operated according to various control constants and with other values for the variables contained within the calculational scheme described herein. These and all other variations which basically rely on the teachings by which this disclosure has advanced the art are properly considered within the scope of this invention as defined by the appended claims.

We claim:

1. An apparatus for determining a steering position of an automotive steering mechanism and controlling an automotive device, comprising:

steering sensor means for generating a steering motion signal related to rotational motion of the steering mechanism;

rate processor means for generating a steering rate signal utilizing said steering motion signal;

position processor means for generating and updating a dynamic center position signal from said steering motion signal and statistically determining a confidence in said dynamic center position signal, said position processor means being operative to set a first flag positive to indicate existence of said confidence in said dynamic center position signal and negative to indicate a lack of said confidence in said dynamic center position signal, said position processor means being further operative to determine an instantaneous steering position signal relative to said steering motion signal and said dynamic center position signal; and control means for controlling an automotive device using said steering rate signal when said first flag is negative and controlling said automotive device using both said steering rate signal and said instantaneous steering position signal when said first flag is positive.

2. An apparatus according to claim 1, wherein said position processor means further comprises a significant event filter means for selectively updating said dynamic center position signal.

3. An apparatus according to claim 1, wherein said position processor means further comprises means for counting center crossings.

4. An apparatus according to claim 1, wherein said position processor means further determines a long term center position from said steering motion signal for comparing against said dynamic center position signal and setting said first flag negative if the difference besween said long term center position signal and said dynamic center position signal exceeds a predetermined amount.

5. A method for determining a steering position of an automotive steering mechanism and controlling an automotive device, comprising the steps of:

counting steering position data from a steering sensor, said steering position data being representative of rotational motion of said steering mechanism;

calculating a steering rate based on said steering position data;

calculating a dynamic center position based on said steering position data;

statistically determining a confidence of said dynamic center position from said steering position data:

setting a first flag positive to indicate existence of said confidence in said dynamic center position and negative to indicate a lack of said confidence in said dynamic center position; and switching a controlled automotive device using said steering rate data when said first flag is negative and switching a controlled automotive device based on both steering rate and steering position when said first flag is positive.

6. A method according to claim 5 further comprising the step of processing said counted steering position data to calculate a long term center position.

7. A method according to claim 5 further comprising the step of calculating an instantaneous steering position of said steering mechanism from said steering position data and updating said dynamic center position when said instantaneous steering position is within a predetermined range.

8. An method according to claim 5 further comprising the step of counting center crossings.

* * * * *